(Model.)
H. REISS.
MECHANICAL MOVEMENT.
No. 496,000. Patented Apr. 25, 1893.
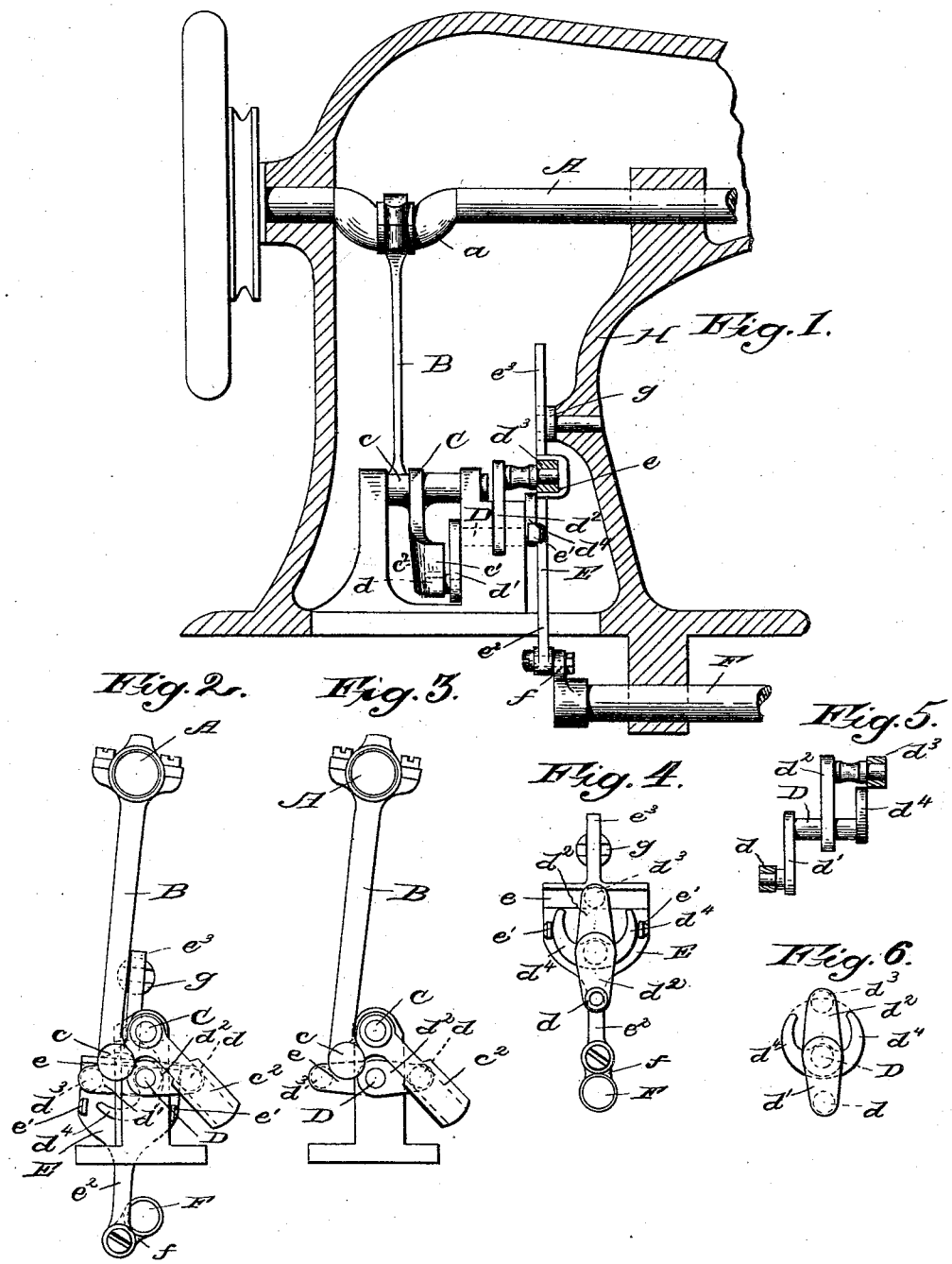
Witnesses:
A. E. Cushman
C. W. Sweeny
Inventor:
Hans Reiss
by Macleod, Calvert & Randall,
his Attorneys.

UNITED STATES PATENT OFFICE.

HANS REISS, OF JERSEY CITY, NEW JERSEY, ASSIGNOR TO THE SINGER MANUFACTURING COMPANY OF NEW JERSEY.

MECHANICAL MOVEMENT.

SPECIFICATION forming part of Letters Patent No. 496,000, dated April 25, 1893.

Application filed October 8, 1892. Serial No. 448,192. (Model.)

*To all whom it may concern:*

Be it known that I, HANS REISS, a citizen of the United States, residing at Jersey City, in the county of Hudson and State of New Jersey, have invented certain new and useful Improvements in Mechanical Movements, of which the following is a specification, reference being had therein to the accompanying drawings.

My invention has for its object to provide a novel mechanical movement by means of which an oscillating motion of more than one hundred and eighty degrees may be imparted to a rocking shaft from a rotating driving shaft. To this end a crank or eccentric on the driving shaft is connected, by a pitman, to an arm of a rocker or rocking shaft which has a second arm having a slot and pin connection with a second rocker or rocking shaft which in turn engages, by a slot and pin connection, a transmitter which is connected to an arm on the shaft to be rocked or oscillated. This transmitter is constructed with a cross head portion having a slot which is entered by a pin or roller stud on an arm of the second rocker; said transmitter also having flanges between which works an eccentric on the second rocker, the said flanges being at right angles to the said slot in the transmitter, so that the said eccentric will move the transmitter laterally at the time when the pin engaging the slot in said transmitter is passing the dead center, thereby preventing the parts from binding. The transmitter is also provided with an arm or guiding portion which is received by a pivoted or swiveled guide which holds the transmitter at all times in proper position when it is in operation.

In the accompanying drawings Figure 1 is a side view of an embodiment of my invention in connection with a suitable supporting frame. Fig. 2 is an end view of the same looking from the left of Fig. 1 and with the framework omitted. Fig. 3 is a view similar to Fig. 2, omitting the transmitter and its connection with the driven shaft, for clearness of illustration, and Fig. 4 illustrates the transmitter and its connections with the driven shaft which are omitted from Fig. 3. Figs. 5 and 6 are detail views of the second rocker.

A denotes a rotating driving shaft provided with a crank $a$, which is connected by pitman B to an arm $c$ of a bell crank lever or rocker C having a second arm $c^2$ provided with flanges $c'$ forming a groove for the reception of a roller stud $d$ on an arm $d'$ of a second rocker or rock shaft D, which has a second arm $d^2$ provided with a roller stud $d^3$. This second rocker D is also provided with an eccentric herein shown as of skeleton form, and consisting of the arms $d^4$, the operating outer portions of which are made in the true arc of a circle eccentric to the axis of the said rocker D, said circle being denoted by dotted lines in Fig. 6.

E denotes a transmitter the eccentric portion or body of which is provided with a groove $e$ which receives the roller stud $d^3$ of the rocker D, the said transmitter being provided with a yoke consisting of the flanges $e'$, which are at right angles to the said groove $e$, and between which flanges the eccentric arms $d^4$ of the rocker D are received. The transmitter E has a lower portion or arm $e^2$ which is connected to an arm $f$ of an operated rock shaft F, and the said transmitter has an upwardly extending portion or arm $e^3$ which is received by a pivoted or swiveled guide $g$ suitably mounted in the frame work H.

The operation of my invention is as follows: Motion being imparted to the driving shaft A, the pitman B operated thereby imparts a rocking movement to the bell crank lever or rocker C, which in turn imparts an oscillating movement to the second rocker D, and the latter causes a reciprocating and oscillating movement to be imparted to the transmitter E, which, in turn, is connected to the operated rocking shaft F. The pin $d^3$ working in the slot $e$ of the transmitter E imparts a reciprocating movement to said transmitter, while the skeleton eccentric, represented by the arms $d^4$ working between the flanges $e'$ of the transmitter, causes a vibrating movement to be imparted to said transmitter, and thus prevents the parts from binding at the times when the operating pin $d^3$ on the said second rocker is passing the dead center.

By the mechanism above described any desired oscillating movement above one hundred and eighty degrees up to nearly a complete circle may be imparted to the operated rock shaft F, the extent of the oscillating movements of the said rock shaft being determined by the relative lengths of the arm $c^2$ of the bell-crank lever or rocker C and the arms of the second rocker D.

Having thus described my invention, I claim and desire to secure by Letters Patent—

1. The combination, with a rotating driving shaft, and a rock shaft to be oscillated, of a bell crank lever or rocker connected with said driving shaft, a second rocker provided with an arm having a slot and pin connection with the said bell crank lever or rocker, said second rocker having a second arm and an eccentric, and a transmitter having a slot and pin connection with the said second arm and having also flanges constituting a yoke between which said eccentric works.

2. The combination with the driving shaft A provided with the crank $a$, of the bell-crank lever or rocker C, the pitman B connecting said crank to an arm of the said bell-crank lever or rocker, a second rocker $d$ having the arms $d'$ and $d^2$ provided with the suitable pins or roller studs $d$ and $d^3$ the former of which is engaged by an arm of the said bell crank lever or rocker, said second rocker having also the skeleton eccentric $d^4$, the transmitter E provided with the groove $e$ in which the said roller stud $d^3$ works, and having the flanges $e'$ between which the said eccentric works, the operated rock-shaft F to which an arm or portion of the said transmitter is connected, and a swiveled guide $g$ receiving an arm of the said transmitter and serving to steady and guide the same.

In testimony whereof I affix my signature in presence of two witnesses.

HANS REISS.

Witnesses:
J. G. GREENE,
CHAS. EELAN.